Aug. 8, 1939.　　　　O. H. BANKER　　　　2,168,856
AUTOMATIC CLUTCH MECHANISM
Filed Aug. 31, 1936　　　2 Sheets-Sheet 1

INVENTOR.
Oscar H. Banker
BY
Quarles & French
ATTORNEYS

Aug. 8, 1939.  O. H. BANKER  2,168,856
AUTOMATIC CLUTCH MECHANISM
Filed Aug. 31, 1936    2 Sheets-Sheet 2
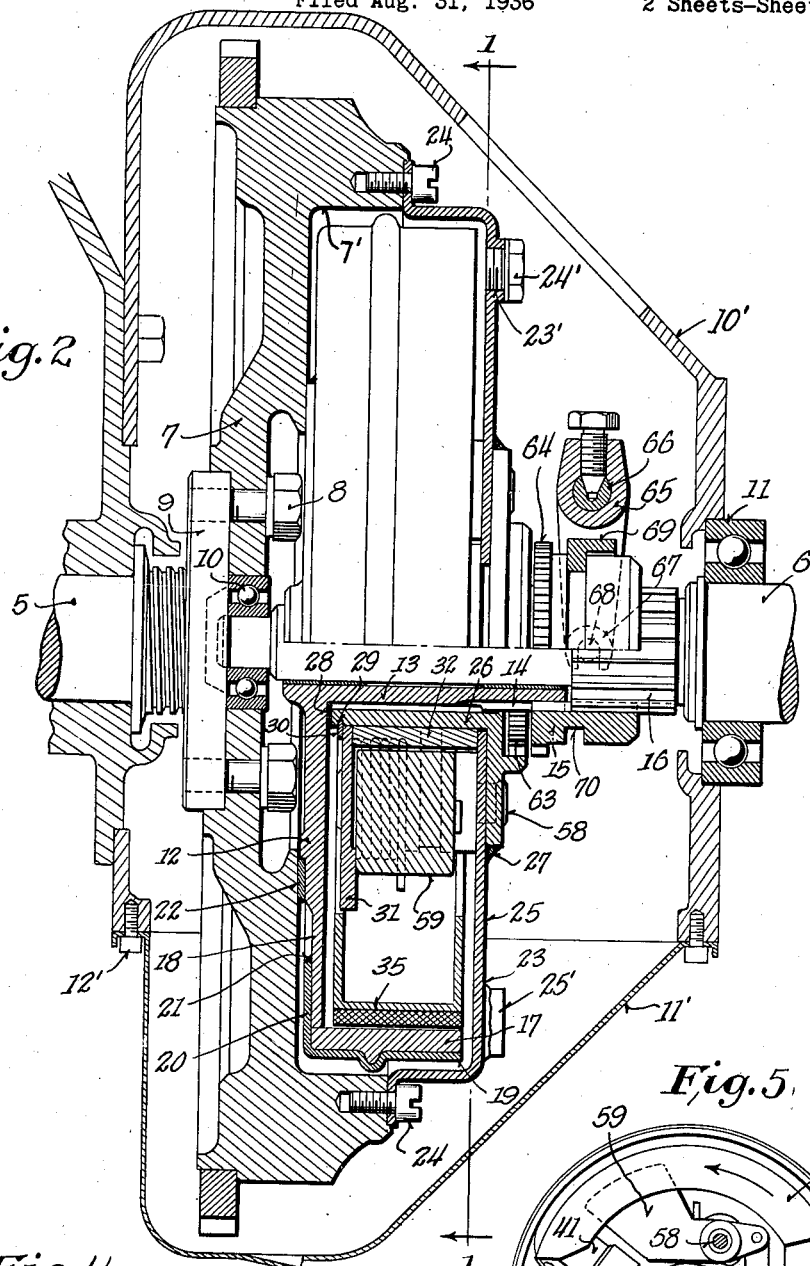
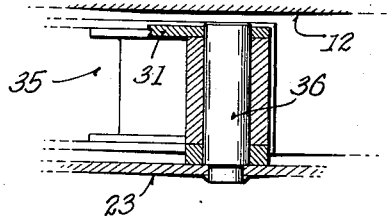
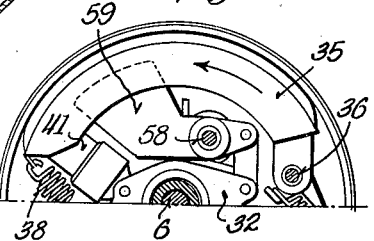
INVENTOR.
Oscar H. Banker
BY
Charles & French
ATTORNEYS Patented Aug. 8, 1939

2,168,856

UNITED STATES PATENT OFFICE 2,168,856

AUTOMATIC CLUTCH MECHANISM

Oscar H. Banker, Chicago, Ill., assignor to New Products Corporation, Chicago, Ill., a corporation of Delaware Application August 31, 1936, Serial No. 98,641
In Great Britain May 19, 1936

10 Claims. (Cl. 192—105)

The invention relates to automatic or speed controlled clutches, more particularly for automotive vehicles.

One of the objects of the invention is to provide an automatic clutch in which the driven shaft can be readily removed or connected to the clutch parts without disturbing the clutch assembly in general simply by pulling it out from or pushing it into said assembly.

A further object of the invention is to provide an automatic clutch in which the main clutch parts can be disassembled and reassembled to the flywheel or drive shaft from an opening at the bottom of the flywheel housing after the driven shaft has been removed.

A further object of the invention is to provide an automatic clutch construction for automotive vehicles in which the clutch parts may run in oil in a chamber formed in part by the flywheel and in part by a housing member secured thereto, thus keeping this oil isolated from the flywheel housing and preventing its contact with other parts of the motor which might be damaged thereby.

A further object of the invention is to provide a very simple arrangement for releasing the driven shaft from the driven member of the clutch at any speed and also for permitting the driven shaft to drive the drive shaft where, particularly when the starter is out of order, it is desired to start the engine by pushing the car.

A further object of the invention is to provide a clutch construction wherein a servo action can be obtained by placing the pivot pins for the clutch shoes at the following end of such shoes so as to furnish the torque for pulling heavy loads such as encountered in truck and bus service without the necessity for using an excessively large clutch drum, and with the same size diameter drum by placing the pivot pins for the clutch shoes on the leading side a very soft and smooth clutching action can be obtained for passenger car use.

A further object of the invention is to simplify and improve upon clutch mechanism of the type shown in my copending application Serial No. 599,896, filed March 19, 1932, which has issued as Patent No. 2,042,454, dated June 2, 1936, wherein the clutch elements are applied to the member to be driven through centrifugally operable double toggle linkages. According to the present invention the linkage mechanism has been greatly simplified, and the novel arrangement hereinafter described has enabled me to greatly reduce the overall dimensions of the clutch mechanism and permits its use in connection with motor vehicle power plants having small flywheels.

The invention further consists in the several features hereinafter set forth and more particularly defined by claims at the conclusion hereof.

In the drawings:

Fig. 2 is a vertical sectional view taken on the line 2—2 of Fig. 1, the lower half being shown in full section;

Fig. 4 is a fragmentary section along the line 4—4 of Fig. 1.

Fig. 5 is a fragmentary view somewhat similar to Fig. 1 but with the parts reversed to obtain a soft engagement of the clutch elements.

Figure 1:
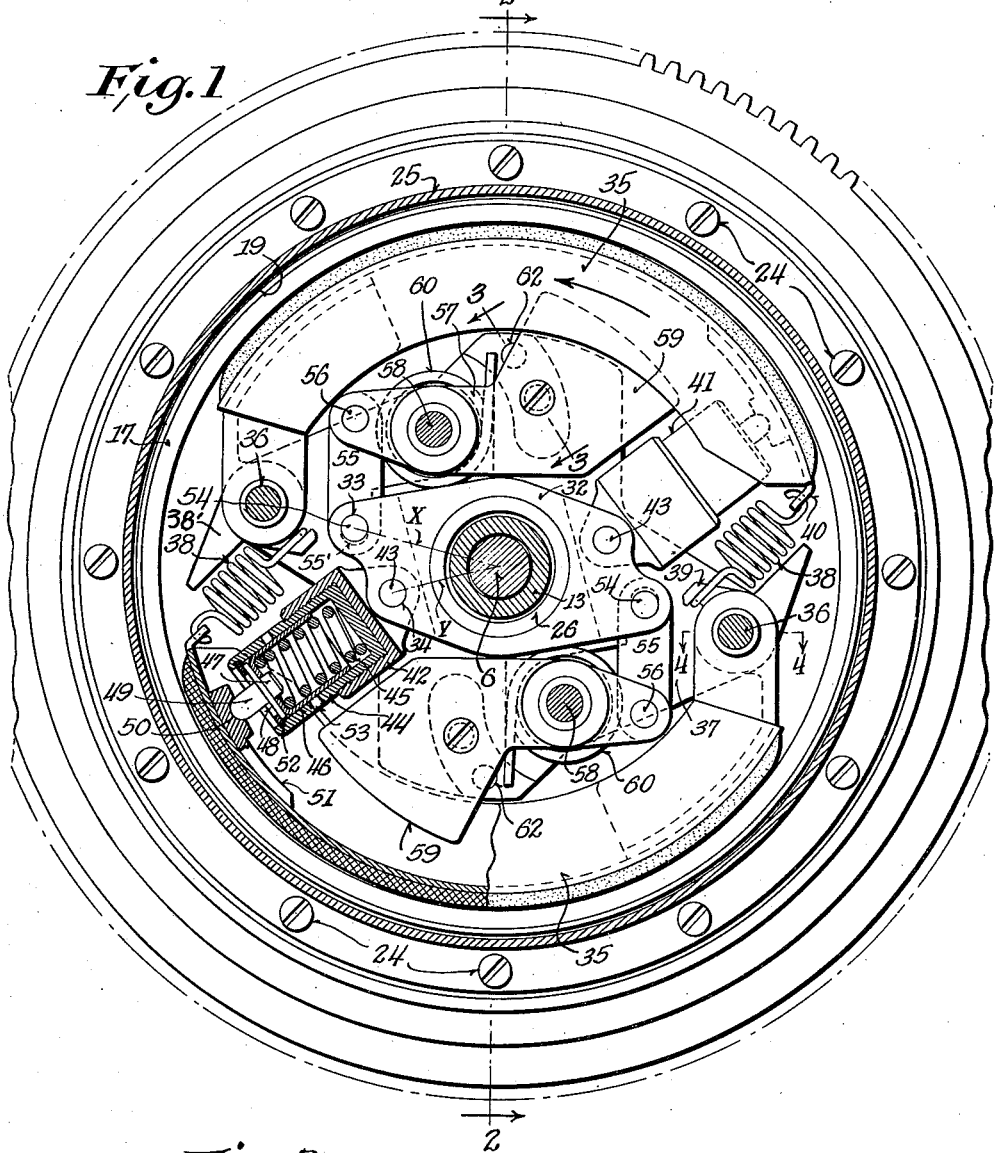
Fig. 1 is a vertical sectional view taken on the line 1—1 of Fig. 2.

Referring to the drawings, the numeral 5 designates a drive shaft, 6 a driven shaft, 7 a flywheel secured by bolts 8 to the flange member 9 integral with said drive shaft, and 10 a ball bearing journal for the inner end of said driven shaft which is also shown as supported by a ball bearing journal 11, mounted in a main housing 10' having a removable bottom cover section 11' secured to said main section by the bolts 12'.

The clutch mechanism embodying the invention is mounted in the casing 10', 11' and is removable from said casing on the removal of the driven shaft 6 and the cover section 11'. This clutch mechanism is designed to automatically connect the drive and driven shafts together when the drive shaft attains a certain predetermined speed and includes a clutch drum structure for connection with the driven shaft and centrifugally operable clutch elements connected with the drive shaft.

The clutch drum structure includes a flanged hub member 12 whose hub 13 is preferably loosely mounted on a portion of the driven shaft and is splined at 14 to engage the intermeshing splines of a slidable or shiftable collar 15 whose splines also intermesh with the splined portion 16 of the driven shaft. Thus the member 12 has a keyed connection with the driven shaft through the collar 15 which may be pulled out of or pushed into engaged position relative to said drum and collar. A ring member 17 fits over the outer periphery of the flange portion 18 of the member 12 and is fixedly secured thereto by an outer reinforcing flanged member 19 whose inturned flange 20 is secured to the flange 18 by welding 21. The flanged drum thus formed carries a thrust ring 22 that may abut against a portion of the rearward face of the flywheel.

The flywheel has a flanged annular supporting and housing member 23 detachably secured thereto by a plurality of screws 24, and the web portion 25 of this member has a flanged equalizer hub member 26 secured thereto as by welding 27. The flywheel 7 is recessed at 7', and this recess cooperates with the member 23 and parts 12 and 26 to form an enclosure or housing which may be filled with the proper amount of oil through an opening 23' in said member 23 normally closed by a suitable plug 24' which is counterbalanced by a diametrically disposed boss 25'. At its inner end the hub portion of said member 26 abuts a thrust washer 28 which slidably fits over the splines 14 of the hub member 12 and abuts against the flanged portion of said member, said member 26 being provided with an annular groove 29 to receive a split retaining ring 30 for a spider 31.

An equalizer 32 is rotatably mounted on the member 26 between the spider 31 and the web portion 25 of the hub member 26 and has spaced holes 33 and 34 on each of opposite sides thereof, and it forms in effect a toggle link connection between the centrifugally operated means and the clutch elements.

The clutch elements are here shown as oppositely disposed semi-cylindrically curved shoes 35, each pivotally mounted at one end on a pin 36 mounted in the spaced arms of each shoe and carried in part by the spider 31 and welded at one end to the member 23. A release spring 38 connects a hook 39 on the pivot end of one shoe with an eye 40 on the free end of the other shoe. A projection 38' on each shoe acts as a nest for the adjacent spring 38 to prevent centrifugal force from distorting or breaking it.

Each shoe has a yieldable thrust link connection 41 with the equalizer 32. This link connection includes a socket member 42 which is pivotally connected to the equalizer by the pin 43 mounted in the hole 34 thereof.

The socket member 42 is circular in shape and internally screw threaded to receive a cylindrical member 44. Within the cylindrical member 44 is a spring 45 over which is placed a cap member 46 having an inturned flange defining a central opening through which extends a lug 47 on a flanged member 48. The member 48 is formed with a projection 49 oppositely directed to the lug 47 and having a spherically curved end engaging a similarly shaped recess 50 in the thrust plate 51 secured to the free end of the shoe 35. The flange member 48 is retained in position in the cylindrical member 44 by a spring ring 52 which is put into place while pressure is applied to the flange member 48 to move the same inwardly against the pressure of the spring 45. Openings 53 are provided in the member 44 to permit the same to be rotated in the socket member 42 to provide an adjustment of the length of the thrust mechanism so as to vary the thrust of the spring pressure exerted through the same or to compensate for wear. The spring 45 is put under a predetermined initial compression pressure in the assembled position of the parts.

A pin 54 is mounted in the hole 33 in the equalizer and is operatively connected by a link 55 and a pin 56 with the short end of a weighted lever 57 pivotally mounted on a stud 58 carried by the hub member 26, the longer end 59 of said lever being the weighted end whose outward movement is normally resisted by a coiled torsion spring 60. While a yieldable and a weighted link connection for one shoe has been described in detail, similar connections are applied to the opposite clutch shoe. The links 55 are preferably connected to the pins 54 by elongating the holes in said links as indicated at 55' to form a lost motion connection between the weights and the equalizer 32.

Figure 3:
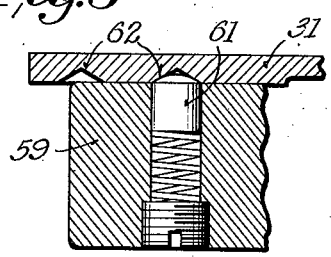
Fig. 3 is a detail sectional view taken on the line 3—3 of Fig. 1.

Each weighted lever is preferably prevented from hunting by spring pressed detent mechanism, such as is shown in Fig. 3 wherein the spring pressed detent 61 is mounted in the weighted member 59 and adapted to engage one or more recesses 62 in the spider or supporting member 31. The weights are shown in Fig. 1 in their inward position, and the recesses 62 shown in full therein receive the detents when the weights are in expanded condition and the clutch shoes are applied to the drum.

With the above construction when the speed of the drive shaft 5 reaches a predetermined value, the weighted levers 57, under the action of centrifugal force, turn counterclockwise upon their pivots 58 against the action of the springs 60. This movement of weighted members 57 will be transmitted by the links 55 to the pins 54 mounted in the equalizer 32, thereby applying a rocking force to the equalizer through lever arms whose distance from the center of the equalizer is $x$. This force is then multiplied and transmitted through the shorter arm Y of the equalizer to the knee of the toggle represented by the pivot 43. Thus the toggle linkages are formed by the equalizer 32 and the link connections 41 and the pressure applied to the equalizer tends to move the pins 43 into a straight line with the center of rotation of the equalizer and the center of the recesses 50. This straightening of the toggle linkages noted above forces the spherically curved ends 49 of the connections 41 radially outwardly against the free ends of the shoes 35 and thus moves them into clutching engagement with the drum member 17. It is to be noted that the position of the pivot pins 43 on the equalizer and the link connections therewith and with the clutch shoes is such that these linkages have a substantially straight line position when the clutch shoes 35 are in applied position. Under these conditions the back pressure exerted by the springs 45 on the toggle linkages has practically no reaction on the weighted members 57 through the equalizer.

The only force, therefore, effective upon each weighted member is the reaction of the spring 60, and it is the force of this spring which overcomes the restraint of the weighted member occasioned by the engagement of the spring pressed detent 61 carried by the lever 59 with the recess 62 in the support 31. The spring 60 is, however, ineffective to overcome this restraint of the weighted member 59 until the centrifugal force acting upon the weighted member has fallen to a certain value. Thus the clutch remains in engagement when the speed of the driving member drops below the speed at which the clutch was engaged. In fact, the clutch shoes 35 may be made to remain in engagement with the clutch drum 17 until the speed of the drive shaft 5 has fallen to that corresponding to the idling speed of the engine connected to said shaft. The lowest speed at which disengagement will occur may be selectively determined on the proper proportioning of the parts and the selection of the proper tension of the springs 60 and the springs operating the detents 61. At the selected speed the spring 60 will overcome the detent 61 causing the weighted member 57 to move inwardly. As will be seen the lost motion connections provided by the slots 55' in the links 55 permit the weighted members 57 to move through a predetermined distance before any pull is exerted by said links 55 upon the pins 54 forming the connection with the equalizer 32. By the time the ends of the slots 55' engage the pins 54, the weighted members 57 have acquired enough momentum to break the toggle at the point 43 from its straight line position with a snap action, thus effecting a quick withdrawal of the clutch shoes 35 from the drum 17.

For connecting the drive member 5 and driven member 6 directly together there is provided a manually operable clutch including a jaw clutch element 63 formed as a part of the member 26 and the jaw clutch element 64 formed as a part of the collar 15. These clutch elements 63 and 64 constitute intermeshing clutch members which when the collar 15 is pushed toward the left as viewed in Fig. 2 intermesh and thus key the driving portion of the clutch including the parts 23 and 26 to the driven shaft through the collar 15 and its splined connection at 16 with said shaft. The collar 15 is under manual control through a manually operable shifter fork 65 pivoted at 66 and whose forked ends 67 engage pins 68 mounted on a split ring 69 which has its bearing in an annular groove 70 in said collar 15.

For immediately releasing the drive member 5 from the driven member 6 the clutch member 15 is shifted from the position shown in Fig. 2 toward the right so as to disengage its splines from the splines 14 of the hub member 13 with the result that the driven member 6 is free of the clutch elements and will not be driven thereby even though the shoes 35 engage the drum 17.

The clutch shoes 35 are pivoted at one end, and the torque capacity of the clutch will depend upon the direction of rotation of the clutch shoes. The greatest clutching effect will be obtained when the shoes are rotated in a direction such that their free ends are the forward ends in the direction of rotation, i. e., when the clutch shoes 35 and their support 37 are rotated in the direction of the arrow shown in Fig. 5, and with this arrangement the clutch shoes have a servo action which is desirable for truck, bus, and other heavy duty service. With the same direction of rotation and the pivots oppositely disposed, as shown in Fig. 1, the clutch will have a soft and smooth action which makes it desirable for passenger car use.

By the arrangement herein described in which one link of each toggle linkage is formed by an equalizer pivoted about the axis of rotation of the drive and driven members and the centrifugally operable means operates on the knee of this toggle linkage, the parts may be very compactly arranged so as to provide a clutch of small diameter, and when the clutch shoes are rotated so that their free ends constitute the forward ends of the shoes, the structure is capable of carrying very heavy loads on a minimum diameter.

It will also be noted that all of the main clutch parts are enclosed in the housing formed in part by the flywheel and the member 23 and that after the shaft 6 is removed from the hub 13 and the collar 15 by an endwise pull and the cover section 11' removed, that the cover plate or member 23, on the unfastening of the bolts 24, may together with the main clutch parts including the drum 12, shoes 35, and their actuating mechanism including the equalizer 32 be removed as a unit from the bottom opening of the main housing 10'. Furthermore, the shaft 6 with its bearing 11 may be removed or replaced relative to the flywheel housing and the clutch mechanism at any time without removing the clutch mechanism.

A clutch in accordance with the present invention is particularly useful in circumstances where the clutch surfaces cannot be kept free of oil. In fact, the clutch as preferably shown in Fig. 2 is enclosed in a housing formed in part by the flywheel and in part by the member 23 connected therewith and adapted to receive oil.

I desire it to be understood that this invention is not to be limited to any particular form or arrangement of parts except in so far as such limitations are included in the claims.

What I claim as my invention is:

1. In a device of the character described, the combination of a rotary drive member, a driven shaft alined with the axis of rotation of said drive member, a clutch mechanism between said drive member and said driven shaft comprising drive means connected to said drive member and including a housing member, a driven member connected to said driven shaft, internal expanding clutch elements supported by said housing member and mounted within the same for engagement with said driven member, said housing member having a hub portion, an equalizer journalled on said hub portion and operatively connected to said clutch elements, and centrifugally operable members supported by said housing member and operatively connected to said equalizer to move said clutch elements into clutching engagement with said driven member.

2. In a device of the character described, the combination of a rotary drive member, a driven shaft alined with the axis of rotation of said drive member, a clutch mechanism between said drive member and said driven shaft comprising drive means connected to said drive member and including a housing member, a drum connected to said driven shaft, internal expanding clutch elements supported by said housing member and mounted within the same for engagement with said drum, said housing member having a hub portion limiting the lateral displacement of said drum, an equalizer journalled on said hub portion and operatively connected to said clutch elements, and centrifugally operable members supported by said housing member and operatively connected to said equalizer to move said clutch elements into clutching engagement with said drum.

3. In a clutch mechanism of the type described, the combination of a flywheel, a sectional housing for said flywheel, a driven shaft alined with the axis of said flywheel and journalled in said housing and at its inner end in said flywheel and removable endwise from said housing, a clutch mechanism within said housing comprising drive means removably connected to the flywheel, a driven member removably connected to said driven shaft, internal expanding clutch elements supported by said drive means and engageable with said driven member, and centrifugally operated means operatively connected to said clutch elements to move the same into clutching engagement with said driven member, said clutch mechanism being removable from said housing as a unit on the removal of said driven shaft and the disconnection of said drive means from said flywheel.

4. In a clutch mechanism of the type described, the combination of a rotatable drive member, a rotatable driven member, clutch elements for connecting said members together in driving relation, means for releasing said clutch elements, centrifugally operated means for applying said clutch elements including weighted members mounted to move with said drive member, an equalizer mounted to turn about the axis of rotation of said drive and driven members and forming links of single toggle linkage connections between said weighted members and their cooperative clutch elements, means connecting each weighted member to said equalizer eccentrically thereof, and means forming a direct and compressible thrust link connection from said equalizer to each of the clutch elements to complete the single toggle linkage connections.

5. In a clutch mechanism of the type described, the combination of a rotatable drive member, a rotatable driven member, clutch elements for connecting said members together in driving relation, means for releasing said clutch elements, centrifugally operated means for applying said clutch elements including pivoted weighted members mounted to move with said drive member, an equalizer mounted to turn about the axis of rotation of said drive and driven members and forming links of single toggle linkage connections between said weighted members and their cooperative clutch elements, means connecting each weighted member to said equalizer to operate with an increased leverage upon the equalizer, and means forming a compressible direct thrust link connection from the equalizer to each of the clutch elements to complete the single toggle linkage connections.

6. In a clutch mechanism of the type described, the combination of a rotatable drive member, a rotatable driven member, clutch elements for connecting said members together in driving relation, means for releasing said clutch elements, centrifugally operated means for applying said clutch elements including weighted members mounted to move with said drive member, an equalizer mounted to turn about the axis of rotation of said drive and driven members and having radially extending arm portions forming links of single toggle linkage connections between said weighted members and their cooperative clutch elements, means connecting each weighted member to the outer ends of the arm portions of said equalizer, and means forming a compressible direct thrust link connection from said equalizer arms to the clutch element to complete said single toggle linkage connections comprising relatively movable members and a spring between and separating said members and normally under a predetermined tension.

7. In a clutch mechanism of the type described, the combination of a flywheel, a sectional casing for said flywheel, a driven shaft alined with the axis of said flywheel and journaled in said casing and at its inner end in said flywheel, a clutch mechanism within said casing including a supporting member secured to said flywheel and cooperating therewith to form a clutch housing, a clutch drum within said clutch housing having a hub portion connected to said driven shaft and in which said driven shaft is mounted, said driven shaft being removable endwise from said clutch housing and said flywheel casing while said clutch mechanism is in assembled position, internal expanding clutch elements carried by said supporting member and movable into engagement with said drum, and centrifugally operated means operatively connected to said clutch elements to move the same into clutch engaging position with said driven member.

8. In a clutch mechanism of the type described, the combination of a flywheel, a sectional casing for said flywheel, a driven shaft alined with the axis of said flywheel and journaled in said casing and at its inner end in said flywheel, a clutch mechanism within said casing including a housing member detachably secured to said flywheel and cooperating therewith to form a clutch housing, a clutch drum within said clutch housing having a hub portion connected to said driven shaft and in which said driven shaft is mounted, said driven shaft being removable endwise from said clutch housing and flywheel casing while said clutch mechanism is in assembled position, internal expanding clutch elements supported by said clutch housing member and engageable with said driven member, and centrifugally operated means operatively connected to said clutch elements to move the same into clutching engagement with said driven member, said clutch mechanism being removable from said flywheel casing as a unit on the removal of said driven shaft and the disconnection of said clutch housing member from said flywheel.

9. In a clutch mechanism, the combination of a revoluble driven drum, a revoluble drive element, arcuate clutch shoes mounted to rotate with said drive element and movable outwardly into engagement with said drum, means for pivotally connecting one end of each clutch shoe to said drive element, and centrifugally operated means carried by said drive element for moving said shoes into clutch engagement with said drum comprising a single toggle linkage for each clutch shoe having two pivotally connected parts movable to substantially a straight line position between the axis of the drive element and the free end of a clutch shoe when the clutch is engaged, one of said parts including a coil spring rendering the part compressible.

10. In a clutch mechanism, the combination of a revoluble driven drum, a revoluble drive element, arcuate clutch shoes mounted to rotate with said drive element and movable outwardly into engagement with said drum, means for pivotally connecting one end of each clutch shoe to said drive element, centrifugally operated means carried by said drive element for moving said shoes into clutch engagement with said drum comprising a single toggle linkage for each clutch shoe having two pivotally connected parts movable to substantially a straight line position between the axis of the drive element and the free end of a clutch shoe when the clutch is engaged, one of said parts including a coil spring rendering the part compressible, weight members movable from withdrawn positions to predetermined expanded positions, detent means for determining said positions, and means connecting said weight members to operate said single toggle linkage.

OSCAR H. BANKER.